(12) United States Patent
Bergström et al.

(10) Patent No.: US 8,872,801 B2
(45) Date of Patent: Oct. 28, 2014

(54) TOUCH APPARATUS WITH SEPARATED COMPARTMENTS

(75) Inventors: Håkan Bergström, Torna Hällestad (SE); Thomas Craven-Bartle, Södra Sandby (SE)

(73) Assignee: Flatfrog Laboratories AB, Lund (SE)

( * ) Notice: Subject to any disclaimer, the term of this patent is extended or adjusted under 35 U.S.C. 154(b) by 0 days.

(21) Appl. No.: 13/325,877

(22) Filed: Dec. 14, 2011

(65) Prior Publication Data

US 2012/0154338 A1 Jun. 21, 2012

Related U.S. Application Data

(60) Provisional application No. 61/423,763, filed on Dec. 16, 2010.

(30) Foreign Application Priority Data

Dec. 16, 2010 (SE) ........................................ 1051334

(51) Int. Cl.
*G06F 3/041* (2006.01)
*G06F 3/042* (2006.01)

(52) U.S. Cl.
CPC ....................................... *G06F 3/042* (2013.01)
USPC ........................................... 345/175; 345/173

(58) Field of Classification Search
CPC ..... G06F 3/042; G06F 3/0412; G06F 3/0416; G06F 3/0423; G06F 2203/04103; G06F 2203/04107; G06F 2203/04109
USPC ................................. 345/156–178; 361/761; 178/18.01–20.04
See application file for complete search history.

(56) References Cited

U.S. PATENT DOCUMENTS

| 3,673,327 | A | | 6/1972 | Johnson et al. |
| 4,737,626 | A | * | 4/1988 | Hasegawa ..................... 250/221 |

(Continued)

FOREIGN PATENT DOCUMENTS

| WO | WO 2005/057399 | 6/2005 |
| WO | WO 2009/048365 | 4/2009 |

(Continued)

OTHER PUBLICATIONS

European Search Report dated Mar. 29, 2012 issued in European Application No. 11193199.4.

(Continued)

*Primary Examiner* — Ilana Spar
*Assistant Examiner* — Herbert L Hagemeier
(74) *Attorney, Agent, or Firm* — Harness, Dickey & Pierce, P.L.C.

(57) ABSTRACT

A touch-sensitive apparatus for determining a location of at least one object on a touch surface. The touch-sensitive apparatus extends in a direction of depth and comprises a light transmissive panel, a display arranged behind the light transmissive panel, and a first compartment and second compartment arranged behind the display. Light from a light emitter arrangement in the first compartment is introduced into the light transmissive panel for propagation by internal reflection. The light is thereafter coupled out to be received by a light detection arrangement in the second compartment. The first and second compartments are separated, such that light from the light emitter arrangement is prevented from reaching the light detection arrangement without first having propagated in the light transmissive panel.

19 Claims, 4 Drawing Sheets

(56) References Cited

U.S. PATENT DOCUMENTS

| | | | |
|---|---|---|---|
| 4,837,430 A * | 6/1989 | Hasegawa | 250/221 |
| 6,972,753 B1 | 12/2005 | Kimura et al. | |
| 7,432,893 B2 | 10/2008 | Ma et al. | |
| 7,924,272 B2 * | 4/2011 | Boer et al. | 345/175 |
| 8,077,147 B2 * | 12/2011 | Krah et al. | 345/163 |
| 8,093,545 B2 * | 1/2012 | Leong et al. | 250/221 |
| 2001/0005308 A1 * | 6/2001 | Oishi et al. | 361/687 |
| 2004/0252091 A1 | 12/2004 | Ma et al. | |
| 2005/0057903 A1 * | 3/2005 | Choi | 361/719 |
| 2006/0114237 A1 | 6/2006 | Crockett et al. | |
| 2006/0158437 A1 * | 7/2006 | Blythe et al. | 345/173 |
| 2007/0075648 A1 | 4/2007 | Blythe et al. | |
| 2008/0278460 A1 * | 11/2008 | Arnett et al. | 345/175 |
| 2009/0091553 A1 | 4/2009 | Keam et al. | |
| 2009/0115919 A1 * | 5/2009 | Tanaka et al. | 348/836 |
| 2009/0153519 A1 | 6/2009 | Suarez Rovere | |
| 2011/0074734 A1 * | 3/2011 | Wassvik et al. | 345/175 |
| 2012/0146948 A1 * | 6/2012 | Tong et al. | 345/175 |

FOREIGN PATENT DOCUMENTS

| | | |
|---|---|---|
| WO | WO 2009/077962 | 6/2009 |
| WO | WO 2010/006882 | 1/2010 |
| WO | WO 2010/006883 | 1/2010 |
| WO | WO 2010/006884 | 1/2010 |
| WO | WO 2010/006885 | 1/2010 |
| WO | WO 2010/006886 | 1/2010 |
| WO | WO 2010/134865 | 11/2010 |
| WO | WO 2011/049511 | 4/2011 |
| WO | WO 2011/049513 | 4/2011 |
| WO | WO 2011/139213 | 11/2011 |

OTHER PUBLICATIONS

U.S. Office Action issued in U.S. Appl. No. 13/325,902, dated Feb. 21, 2014.

* cited by examiner

TOUCH APPARATUS WITH SEPARATED COMPARTMENTS

CROSS-REFERENCE TO RELATED APPLICATIONS

The present application claims the benefit of Swedish patent application No. 1051334-9, filed on Dec. 16, 2010, and U.S. provisional application No. 61/423,763, filed on Dec. 16, 2010, which are incorporated herein by reference.

The invention is related to U.S. provisional application No. 61/423,791, filed on Dec. 16, 2010, as well as WO2010/006882, WO2010/006883, WO2010/006884, WO2010/006885, and WO2010/006886, all of which are incorporated herein by reference.

TECHNICAL FIELD

The invention relates to a touch-sensitive apparatus for determining a location of at least one object on a touch surface.

BACKGROUND ART

To an increasing extent, touch-sensitive apparatuses are being used for providing input data to computers, cell phones, electronic measurement and test equipment, gaming devices, etc. Such apparatuses often include a graphical user interface (GUI) for a user to interact with by using e.g. a pointer, stylus or one or more fingers. The GUI is typically dynamic and may be provided by a display device integrated with, or placed behind or underneath a light transmissive panel that defines a touch surface.

One technique for providing touch sensitivity to an apparatus is based on frustrated total internal reflection (FTIR) where light is introduced to propagate inside the light transmissive panel by internal reflection between the touch surface and an opposite surface. The internal reflection is at least partially caused by total internal reflection (TIR) which is sustained as long as light is injected into the touch panel at an angle to the normal of the panel which is larger than the critical angle at a light-injection site on the panel.

When the propagating light impinges on the touch surface, the touch surface allows the light to interact with a touching object, and at the location of the touch, part of the light may be scattered and/or absorbed by the object, and part of the light may continue to propagate in the panel. The part of light that continues to propagate has a decreased energy level due to the touch. The location of the touch may then be determined by continuously measuring energy of light that is coupled out of the light transmissive panel.

Several techniques for determining a location of a touch based on FTIR are known, e.g. in U.S. Pat. No. 6,972,753, U.S. Pat. No. 7,432,893, US2006/0114237, US2007/0075648, US2009/0153519, WO2009/048365 and WO2010/006885.

To the extent that the prior art reveals any specific implementations of arrangements for generating and injecting light into the panel and for extracting and detecting light from the panel, these arrangements are typically placed in level with the panel around its perimeter.

As an alternative, WO2010/006885 proposes the use of folding systems at the perimeter of the panel, whereby light may be directed from and to various emitters and detectors. It should be understood that in order to enable touch sensitivity, the panel needs to be provided with propagating light over most of the touch surface or over the full extent of the touch surface, from at least two different directions. To enable multi-touch sensitivity, it may be preferable to use light sheets from more than two different directions. Thus, a number of different light sheets need to be injected into and extracted from the panel, and directed from and to various emitters and detectors.

The described techniques are generally capable of properly generating and injecting light into the panel as well as extracting and detecting light from the panel. However, the arrangement of emitters and detectors tends to be complex and it may be difficult to properly place the detectors and the emitters, especially if more than two light sheets are to be generated and detected.

SUMMARY

It is an object of the invention to at least partly overcome one or more of the above-identified limitations of the prior art. In particular, it is an object to provide a touch-sensitive apparatus with a structural layout that facilitates an efficient arrangement of light emitters and/or detectors.

Hence a touch-sensitive apparatus for determining a location of at least one object on a touch surface is provided. The touch-sensitive apparatus extends in a direction of depth and comprises: i) a light transmissive panel that defines the touch surface, ii) a display arranged, in the direction of depth, behind the light transmissive panel and configured to present an image that is visible through the light transmission panel, iii) a first compartment arranged, in the direction of depth, behind the display and comprising a light emitter arrangement configured to emit light to be introduced into the light transmissive panel for propagation by internal reflection in the light transmissive panel, and iv) a second compartment arranged, in the direction of depth, behind the display and comprising a light detection arrangement configured to receive light that has propagated in the light transmissive panel. The second compartment is separated from the first compartment, such that light emitted from the light emitter arrangement is prevented from reaching the light detection arrangement without first having propagated in the light transmissive panel.

The touch-sensitive apparatus differs from conventional touch-sensitive apparatuses e.g. in that one compartment is used for the light emitter arrangement while another compartment is used for the light detection arrangement. This difference provides a number of advantages, as will be apparent from the following detailed description as well as from the drawings.

As will be further elucidated below, it has been observed that some embodiments of the apparatus may be more advantageous than others in respect of providing various technical effects. Such embodiments are defined by the dependent claims.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
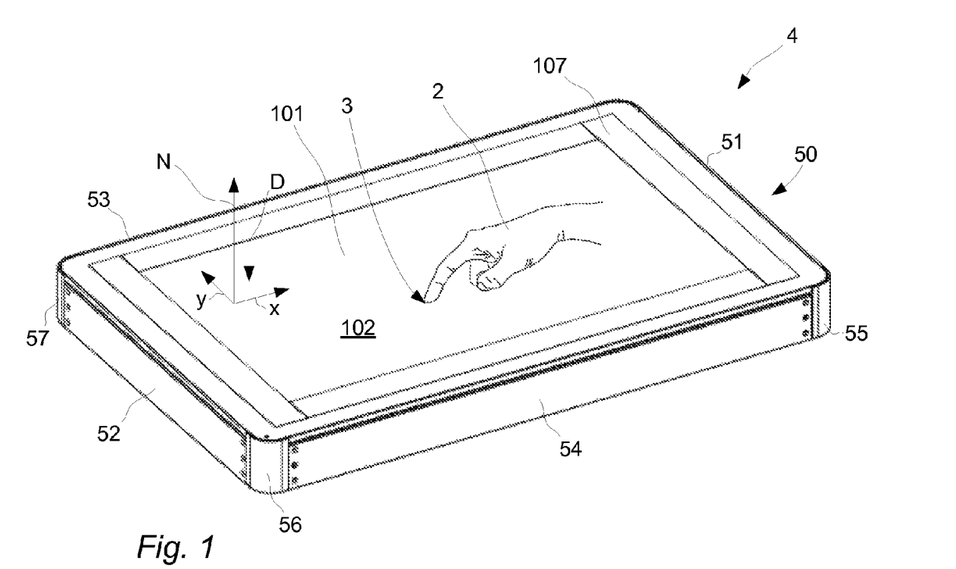
FIG. 1 is a perspective view of a touch-sensitive apparatus.

With reference to FIG. 1 an embodiment of a touch-sensitive apparatus 4 is illustrated. The touch-sensitive apparatus 4 has a light transmissive panel 101 that defines a touch surface 102. The light transmissive panel 101 is herein referred to as the "panel", while the touch-sensitive apparatus 4 is referred to as the "apparatus". An object 2 may interact with the touch surface 102, for example by touching the touch surface 102 at a location 3. The touch surface 102 has a surface normal N, or simply normal, in form of a vector that is perpendicular to the touch surface 102. The apparatus 4 extends in three dimensions along a first direction x, along a second direction y and in a direction of depth D. The direction of depth D is parallel with and has a direction that is opposite the surface normal N. Thus, the direction of depth D may be seen as the direction from the touch surface 102 and into the apparatus 4.

The panel 101 may be planar (as shown) or curved. If the panel 101 has a curved touch surface 102, the direction of depth D may deviate from the surface normal N and instead be a general or overall direction from the touch surface 102 and into the apparatus 4, e.g. towards its rear side. For example, the direction of depth D may coincide with the direction by which a user of the apparatus 4 views the touch surface 102 during interaction with the apparatus 4.

Figure 2:
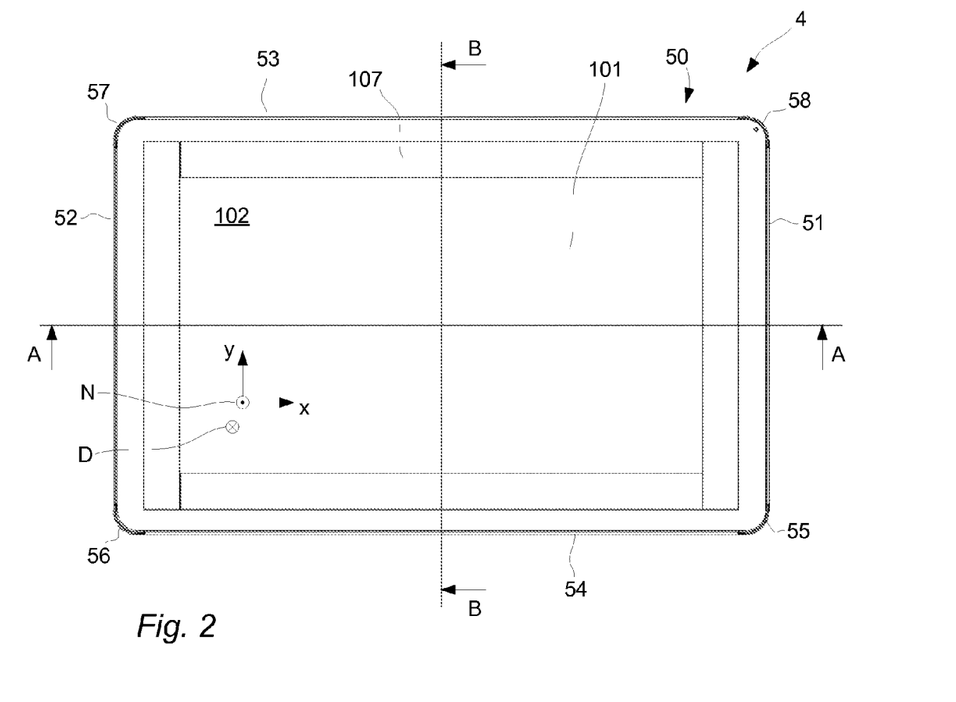
FIG. 2 is a top plan view of the touch-sensitive apparatus of FIG. 1.

FIG. 2 is a front view of the apparatus 4, i.e. a view in which the touch surface 102 faces the user. The apparatus 4 has a peripheral frame structure 50 that comprises a first elongated member 51, a second elongated member 52, a third elongated member 53 and a fourth elongated member 54 that are mutually connected to form a rectangular shape. The first elongated member 51 and the second elongated member 52 form opposite short-sides of the peripheral frame structure 50 while the third elongated member 53 and the fourth elongated member 54 form opposite long-sides. The first elongated member 51 is connected to the fourth elongated member 54 via a first frame corner component 55, and three similar framer corner components 56, 57, 58 connect the fourth elongated member 54 to the second elongated member 52, the second elongated member 52 to the third elongated member 53, and the third elongated member 53 to the first elongated member 51. The peripheral frame structure 50 forms an outer boundary of the apparatus 4.

A surface layer 107 is arranged at a peripheral section of the panel 101 for hiding e.g. a light redirecting arrangement arranged there under.

Figure 3A:
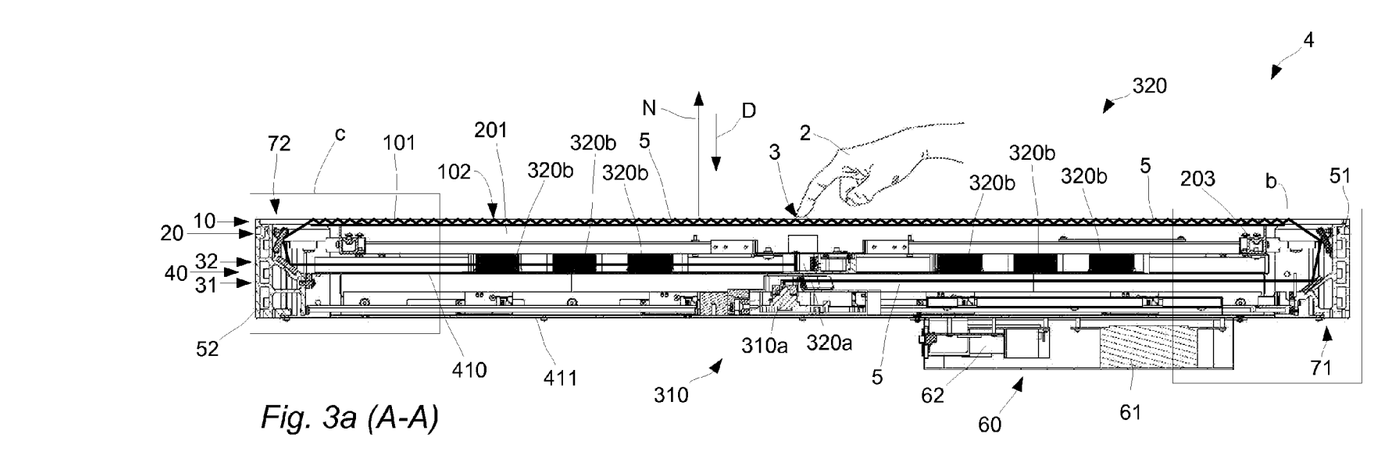
FIG. 3a is cross-sectional view of the touch-sensitive apparatus of FIG. 1, as seen along section A-A in FIG. 2, FIGS. 3*b* and 3*c* are enlarged, partial views of FIG. 3*a*.

With reference to FIG. 3*a* a cross-section of the apparatus 4 is shown, as seen along section A-A of FIG. 2. The apparatus 4 has a number of components and/or compartments that are arranged in the direction of depth D.

As seen in the direction of depth D, the apparatus 4 first comprises the panel 101 that defines the touch surface 102. The panel 101 is arranged on the elongated members 51-54 which thus support the panel 101 around its periphery. This means that the panel 101 may be mounted on the frame structure 50. The panel 101 forms a structural compartment that may be referred to as a panel compartment 10, which is defined by the boundaries of the panel 101.

A display 201 is arranged, in the direction of depth D, behind the panel 101 and is configured to present an image that may be viewed through the panel 101. The display 201 and the presentation of an image are per se implemented according to known techniques and standards, and basically any type of display or screen may be used, including but not limited to an LCD (Liquid Crystal Display), a plasma display, and an OLED (Organic Light-Emitting Diode) display. The display 201 forms a structural compartment that may be referred to as a display compartment 20, which is defined by the boundaries of the display 201. Preferably, for proper structural support the display 201 is mounted on the frame structure 50, either directly on the elongated members 51-54 or via support members, such as support member 203, which connect the display 201 to the peripheral frame structure 50.

A light generation compartment 31 is arranged behind the display 201 as seen in the direction of depth D. The light generation compartment 31, which is also referred to as a "first compartment", comprises a light emitter arrangement 310. The light emitter arrangement 310 is configured to emit light 5 to be introduced into the panel 101 for propagation by internal reflections in the panel 101.

Additionally, a light detection compartment 32 is arranged behind the display 201 as seen in the direction of depth D. The light detection compartment 32, which is also referred to as a "second compartment", comprises a light detection arrangement 320. The light detection arrangement 320 is configured to receive light that has propagated in the panel 101 by internal reflections. In the illustrated embodiment, the first compartment 31 is arranged behind the second compartment 32 as seen in the direction of depth D. This relative arrangement of the compartments 31, 32 may be advantageous in that e.g. access and any required adjustment of the light emitter arrangement 310 may be more efficiently facilitated.

The light emitter arrangement 310 may include one or more radiation sources that emit light in the form of one or more beams. The radiation source(s) may be any type of device capable of emitting radiation in a desired wavelength range, such as a diode laser, a vertical-cavity surface-emitting laser, or alternatively a light-emitting diode (LED), an incandescent lamp, a halogen lamp, etc. The light emitter arrangement 310 is typically configured to generate the light 5 as one or more sheets that extend in a geometric plane perpendicular to the surface normal N and within the first compartment 31.

Figure 5:
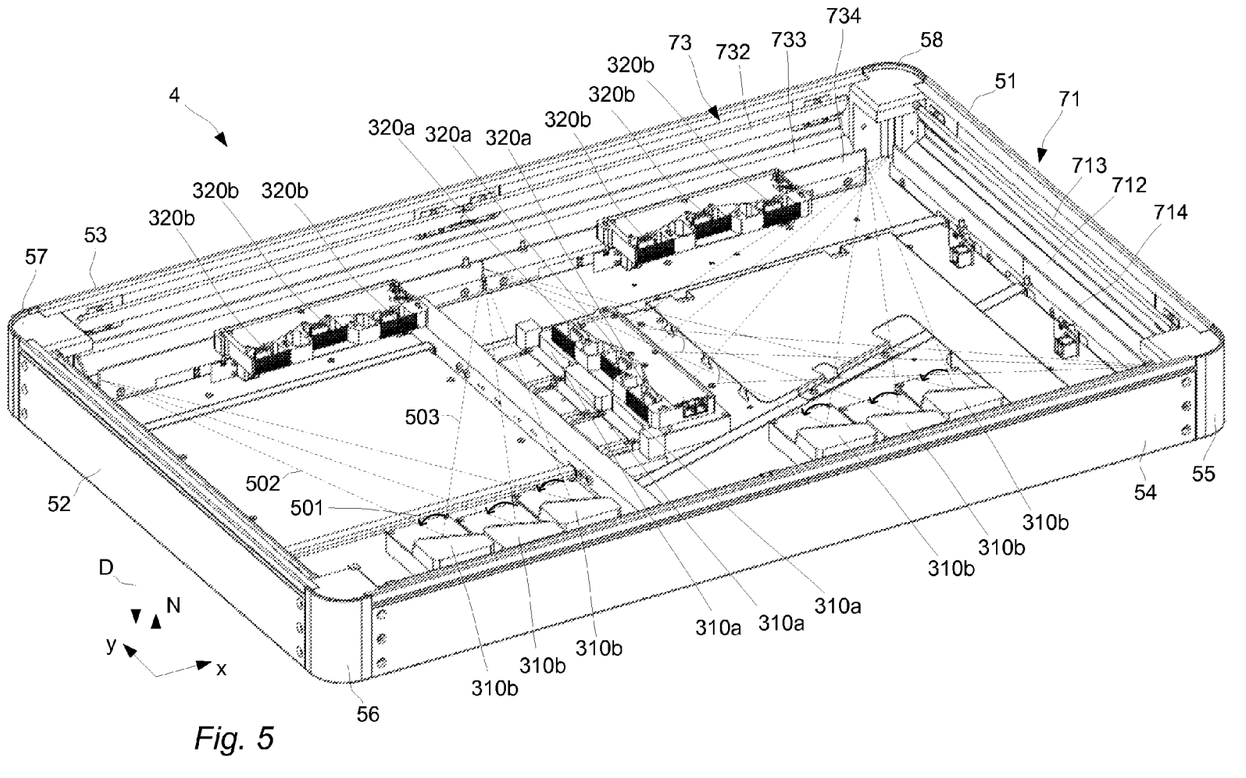
FIG. 5 is a perspective view of a touch-sensitive apparatus of FIG. 1, where a light transmissive panel and a display are removed.

Such an embodiment is further illustrated in FIG. 5, which is a perspective view of the interior of the apparatus 4 in FIG. 1. The sheets of light are generated by sweeping beams of light within the first compartment 31 around a respective axis of rotation. In the illustrated embodiment, the light emitter arrangement 310 comprises a set of scanner modules 310*a*, 310*b*. Each scanner module is a unitary component that includes at least one movable deflection element (not shown) which is controllable to deflect (scan) a beam of light from a radiation source (not shown) in a desired direction around an axis of rotation. The radiation source may be, and typically is, included in the scanner module 310*a*, 310*b*. Each scanner module 310*a*, 310*b* thus generates an angular scan of a beam of light within the first compartment 31. In FIG. 5, each such angular scan is indicated by an arched arrow between dotted lines representing the start and end locations of the angularly swept beam 5. For example, reference numeral 501 indicates an angular scan between dotted lines 502 and 503.

In the embodiment of FIG. 5, the scanner modules 310*a* are arranged to sweep beams in the y direction, and the scanner modules 310*b* are arranged to sweep beams in the x direction. The scanner modules 310*a* are arranged at a center of the apparatus 4, behind a central portion of the panel 101. The scanner modules 310b are however not centered, but arranged closer to the fourth elongated member 54 than to the third elongated member 53.

The light detection arrangement 320 may include one or more light detectors, which may be any type of sensor capable of measuring the energy of incident light. Such sensors include e.g. optical detectors, photoresistors, photovoltaic cells, photodiodes, reverse-biased LEDs acting as photodiodes, charge-coupled devices, etc. In the illustrated embodiment, see FIG. 5, the light detection arrangement comprises nine light detectors 320a, 320b. As will be described in further detail below, each light detector 320a, 320b is arranged to receive a respective sheet of light, when the sheet of light has propagated through the panel 101 (see FIG. 3a). The sheets of light have an extension in a geometric plane perpendicular to the surface normal N within the second compartment 32. For reasons of clarity of presentation, these sheets of light are not indicated in FIG. 5.

In the embodiment of FIG. 5, the light detectors 320a are arranged to receive beams swept in the y direction, and the light detectors 320b are arranged to receive beams swept in the x direction. The light detectors 320a are arranged at a center of the apparatus 4, behind the central portion of the panel 101. The light detectors 320b are however not centered, but arranged closer to the third elongated member 53 than to the fourth elongated member 54.

For allowing the sheets of light 5 generated by the light emitter arrangement 310 to be introduced into the panel 101 the apparatus 4 includes a first redirecting arrangement 71.

Figures 3B, 3C:
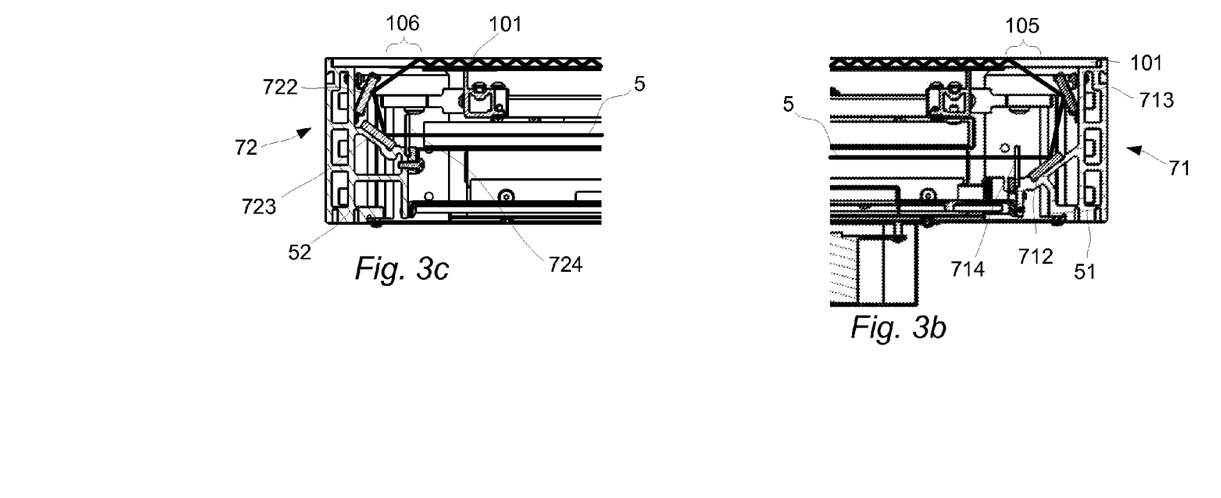

With further reference to FIG. 3b, which is an enlarged view of section "b" in FIG. 3a, the first redirecting arrangement 71 is mounted on the first elongated member 51 such that it introduces into the panel 101 light 5 that is emitted from the light emitter arrangement 310. Specifically, the first redirecting arrangement 71 comprises a Fresnel lens 714, a first mirror 712 and a second mirror 713. The Fresnel lens 714, the first mirror 712 and the second mirror 713 are all elongated components that are mounted on and extend along the first elongated member 51.

As indicated in FIG. 5, the Fresnel lens 714 is arranged to be swept by the beams of light from the scanner modules 310a. After passing the Fresnel lens 714, each angularly swept beam is converted (re-directed) into an output beam with an essentially invariant main direction along the Fresnel lens 714. In other words, an input beam which is swept angularly in one geometric plane along the Fresnel lens is converted into an output beam which is translated in the same geometric plane with an essentially fixed main direction beam (denoted "fixed-direction beam" in the following). Furthermore, the Fresnel lens 714 is configured to impart different main directions to the beams from the different scanner modules 310a. Further details on the generation and use of such fixed-direction beams are found in WO2010/006882 and WO2010/006886, in particular with reference to the beam arrangements denoted "v-scan" and "Ψ-scan" therein.

After passing the Fresnel lens 714, the light impinges on the first mirror 712, as shown in FIG. 3b. The Fresnel lens 714 and the first mirror 712 are arranged essentially level with the first compartment 31. The first mirror 712 is inclined in relation to the light from the Fresnel lens 714, such that the light is folded towards the second mirror 713. The second mirror 713 is closer to the panel 101 and is inclined such that the light from the first mirror 712 is folded again in a direction towards an incoupling site 105 on the panel 101, which thereby introduces the light into the panel 101. The incoupling site 105 typically comprises one or more incoupling structures (not shown), which may be of any conventional type, e.g. as disclosed in WO2010/006882, WO2010/006885 and WO2010/006886. The incoupling site 105 extends along the panel 101 in a direction parallel with the first elongated member 51.

Generally, the elongated member 51, and thus the frame structure 50, defines a common mounting part for the different components 712, 713, 714 of the redirecting arrangement 71. The provision of such a common mounting structure serves to limit the chain of tolerances between the components 712, 713, 714 that condition the beams of light before they are coupled into the panel 101. Limiting the chain of tolerances enables a predictable performance of the redirecting arrangement 71. The chain of tolerances may be further contained by also mounting the panel 101 on the frame structure 50, as in the illustrated embodiment. The use of the frame structure 50 as a common mounting part also serves to facilitate assembly of the apparatus 4, in particular the mounting of the redirecting arrangement 71.

The light introduced via the incoupling site 105 propagates by total internal reflection (TIR) within the panel 101. The propagation of light 5 by TIR is sustained as long as the light 5 is injected into the panel 101 at an angle to the surface normal N which is larger than the critical angle at the incoupling site 105 of the panel 101. When the propagating light 5 impinges on the touch surface 102, the touch surface 102 allows the light 5 to interact with the touching object 2, and at the location 3 of the touch, part of the light 5 may be scattered by the object 2, part of the light 5 may be absorbed by the object 2 and part of the light 5 may continue to propagate in the panel 101 in its original direction in the panel 101. The interaction between the touching object 2 and the touch surface 102 is typically defined by the area of contact between the object 2 and the touch surface 102, and results in the mentioned interaction between the object 2 and the propagating light 5. The interaction between the object 2 and the light 5 may involve so-called frustrated total internal reflection (FTIR), in which energy of the light 5 is dissipated into the object 2 from an evanescent wave formed by the propagating light 5, provided that the object 2 has a higher refractive index than the material surrounding the touch surface 102 and is placed within less than several wavelengths distance from the touch surface 102.

With further reference to FIG. 3c, which is an enlarged view of section "c" in FIG. 3a, the apparatus 4 has a second redirecting arrangement 72 that receives light 5 coupled out of the panel 101. The second redirecting arrangement 72 is arranged at the second elongated member 52, i.e. at a side of the panel 101 that is opposite a side at which the first redirecting arrangement 71 is arranged.

Specifically, the second redirecting arrangement 72 is mounted on the second elongated member 52 and comprises a Fresnel lens 724, a first mirror 722 and a second mirror 723. The Fresnel lens 724, the first mirror 722 and the second mirror 723 are elongated components that are mounted on and extend along the second elongated member 52.

The light 5 is coupled out of the panel 101, i.e. exits the panel 101, via an outcoupling site 106 on the panel 101. In the illustrated example, the outcoupling site 106 is opposite the touch surface 102. The outcoupling site 106 extends along the panel 101 in a direction parallel with the second elongated member 52 and comprises an outcoupling structure (not shown) that may structurally correspond to the incoupling structure of the incoupling site 105.

After the light 5 is coupled out of the panel 101 at the outcoupling site 106 it impinges on the first mirror 722 of the second redirecting arrangement 72. The first mirror 722 is inclined in relation to the touch surface 102, such that the light 5 is folded towards the second mirror 723. The second mirror 723 is further away from the panel 101 than the first mirror 722 and is inclined such that the light from the first mirror 712 is folded again in a direction into the second compartment 32. The Fresnel lens 724 is arranged to redirect the light onto the light detection arrangement 320. The Fresnel lens 724 and the second mirror 723 are arranged essentially level with the second compartment 32. The function of the Fresnel lens 724 is to direct each swept fixed-direction beam onto a respective light detector 320a, shown in FIG. 5. Thus, the respective fixed-direction beam is swept along the Fresnel lens 724 and thereby redirected onto one of the light detectors 320a, which generate signals that represent the energy (or equivalently, the power or intensity) of the received light as a function of time, for each of the beams generated by the scanner modules 310a.

Figure 4:
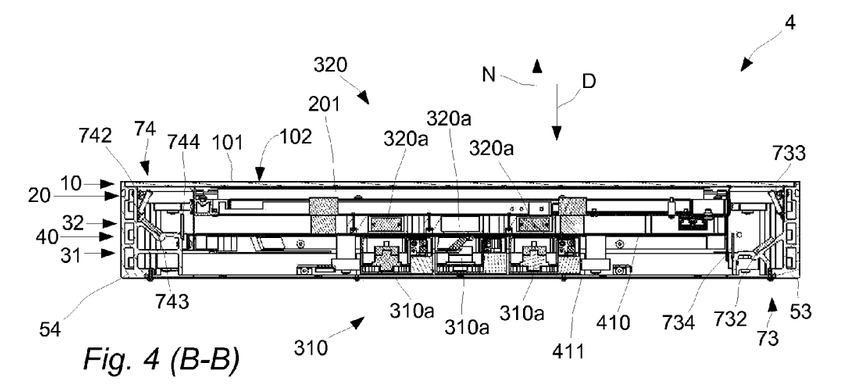
FIG. 4 is cross-sectional view of the touch-sensitive apparatus of FIG. 1, as seen along section B-B in FIG. 2.

With reference to FIG. 4 another cross-section of the apparatus 4 is shown, as seen along section B-B of FIG. 2. In this figure it may be seen that apparatus 4 has a third redirecting arrangement 73 that comprises a Fresnel lens 734, a first mirror 732 and a second mirror 733 that are mounted on the third elongated member 53. The Fresnel lens 734, the first mirror 732 and the second mirror 733 of the third redirecting arrangement 73 are elongated and extend along the third elongated member 53.

The apparatus 4 has a fourth redirecting arrangement 74 that comprises a Fresnel lens 744, a first mirror 742 and second mirror 743 that are mounted on the fourth elongated member 54. The Fresnel lens 744, the first mirror 742 and the second mirror 743 of the fourth redirecting arrangement 74 are elongated and extend along the fourth elongated member 54.

The light emitter arrangement 310 is operable to generate sheets of light also in a direction towards the third redirecting arrangement 73. The generated sheets of light are by the third redirecting arrangement 73 redirected and folded so as to be coupled into the panel 101 in which the sheets of light propagate by TIR towards an edge of the panel 101 at the fourth elongated member 54. The propagated sheets of light are coupled out of the panel 101 and then folded and redirected by the fourth redirecting arrangement 74 in a direction towards the light detection arrangement 320. The light detection arrangement 320 then generates signals that represent the energy of the received light from each sheet of light as a function of time. Apart from being arranged at different elongated members, the third redirecting arrangement 73 is similar to the first redirecting arrangement 71 and the fourth redirecting arrangement 74 is similar to the second redirecting arrangement 72.

In the illustrated embodiment, see FIG. 5, six scanner modules 310b are arranged to generate a respective angular scan of a beam of light in the x direction within the first compartment 31. The six scanner modules 310b are arranged in two groups, with each scanner module 310b in the left-hand and right-hand groups in FIG. 5 being arranged to generate an angular scan along the left-hand and right-hand portion of the third redirecting arrangement 73, respectively, as indicated by the dotted lines. Thereby, the light from each group of scanner modules 310b results in three swept fixed-direction beams, which after propagating through the panel are directed onto a respective light detector 320b. As understood from FIG. 5, the two groups of scanner modules 310b are operable to jointly generate three full beam sweeps across the panel in the x direction, by each group sweeping three beams of light inside the panel along approximately half of the panel in the x direction.

With reference to FIG. 3a, the apparatus 4 has a power supply unit 60 arranged, in the direction of depth D, behind the first and second compartments 31, 32. The power supply unit 60 comprises a transformer 61 and an electronics module 62 that feed the light emitter arrangement 310, the light detection arrangement 320 and any other power requiring component of the apparatus 4 with an electrical current.

During operation of the apparatus 4 the light detection arrangement 320 measures the energy of all light it receives and outputs one or more signals that reflect the measured energy. Conventional techniques are then used for determining the location 3 of the touch on the touch surface 102. The determined location 3 may thereafter be used for any suitable application that employs the display 201 for interaction with a user. Examples of suitable techniques for determining the location 3 may be found in e.g. U.S. Pat. No. 7,432,893, US2009/0153519, WO2010/006882, WO2010/006883, WO2010/006884, WO2010/006885, WO2010/006886, WO2011/049511, WO2011/049513, WO2011/139213, as well as in Applicant's PCT application No. PCT/SE2011/051201, filed on Oct. 7, 2011, which are all incorporated herein by reference.

Reverting to the operation of the apparatus in the illustrated example, the scanner modules 310a are controlled to emit light in form of three beams that are repeatedly swept or scanned across the first redirecting arrangement 71. The three beams are coupled into the panel 101, propagate in the panel 101 and are coupled out at the second redirecting arrangement 72 to be redirected onto the light detectors 320a. Similarly, the scanner modules 310b are controlled to emit light in form of six beams that are repeatedly swept or scanned across the third redirecting arrangement 73. Generally, three of the six beams are swept across half of the third redirecting arrangement 73 while the other three beams are swept across the other half of the third redirecting arrangement 73. The beams from the scanner modules 310b are coupled into the panel 101, propagate in the panel 101 and are coupled out at the fourth redirecting arrangement 74 to be redirected onto the light detectors 320b. It should be realized that the scanner modules 310a, 310b may be activated concurrently or sequentially, or in any combination thereof.

By providing spatially separated first and second compartments 31, 32 for the light emitter arrangement 310 and the light detection arrangement 320, respectively, the light emitter arrangement 310 may be given a layout which is essentially independent of the layout of the light detection arrangement 320. In other words, when designing the apparatus, the placement of the scanner modules 310a, 310b may be optimized separately from the placement of the light detectors 320a, 320b.

Furthermore, the provision of spatially separated first and second compartments 31, 32 also enables optical separation of the first and second compartments 31, 32. This means that light from the light emitter arrangement 310 is prevented from reaching the light detection arrangement 320 without first having propagated in the panel 101. By optically separating the second compartment 32 from the first compartment 31, the light detection arrangement 320 may generate a signal with less noise since it receives less stray light from the light emitter arrangement 310. This may be advantageous e.g. in that the apparatus 4 becomes less dependent on signal processing algorithms that require significant calculation efforts.

In the illustrated embodiment, the first compartment 31 is arranged, in the direction of depth D, at a different distance from the display 201 than the second compartment 32, such that the compartments 31, 32 are spatially separated in the direction of depth D. Such an arrangement of the compartments 31, 32 maximizes the available space for the light emitter arrangement 310 and for the light detection arrangement 320, respectively. It should be realized that the compartments 31, 32 should provide unobstructed beam paths for all sheets of light that are generated and received by the light emitter arrangement 310 and the light detection arrangement 320, respectively. By maximizing the available space for each arrangement 310, 320, the freedom for defining the layout of the light emitter arrangement 310 and the light detection arrangement 320 is increased, which in turn may enable a design of the apparatus that provides improved performance, e.g. with respect to the number of simultaneous touches that may be detected, the detection speed, the manufacturing cost, the required processing power for touch determination, the precision of the determined touch locations, the ability to produce a signal with less noise, etc.

The approach of using two distinct compartments for providing such improved performance is quite different from conventional techniques which instead implement various kinds of signal processing techniques, more capable processing units, special incoupling/outcoupling structures etc.

In the illustrated embodiment, the second compartment 32 is located closer to the display 201 than the first compartment 31. In an alternative embodiment (not shown), the first compartment 31 is instead located closer to the display 201 than the second compartment 32.

As seen from the figures, the first compartment 31 may have a first planar extension while the second compartment 32 may have a second planar extension. In the illustrated example, each of the first and second compartments 31, 32 has an extension in the direction of depth D and a planar extension that is parallel with the touch surface 102. The first compartment 31 is structurally separated from the second compartment 32, i.e. the compartments are not virtual or merely functional compartments.

In the illustrated embodiment, the apparatus comprises a sheet 410 (see FIGS. 3a and 4) which is arranged between the first compartment 31 and the second compartment 32. The sheet 410 forms a structural compartment that may be referred to as a sheet compartment 40, which compartment 40 is defined by the boundaries of the sheet 410. The sheet 410 may be made of metal and may have a surface that is parallel with the touch surface 102. Thus, the sheet 410 may have a planar extension in between the first compartment 31 and the second compartment 32, so as to efficiently prevent light emitted from the light emitter arrangement 310 from entering the light detection arrangement 320 unless the light 5 has first propagated in the panel 101. Of course, the sheet 410 may have openings (not shown), such as cable penetrations or ducts, as long as the openings do not allow any light to pass through the sheet 410 and enter the light detection arrangement 320. Conceptually, the sheet 410 is thus a light blocking element between the first and second compartments 31, 32.

To properly seal the apparatus 4 it comprises a rear plate 411 which is, as seen in the direction of depth D, arranged behind the first compartment 31. The rear plate 411 may however be part of the compartment that is furthest from the touch surface 102, i.e. the first compartment 31 in the illustrated example.

Figure 6:
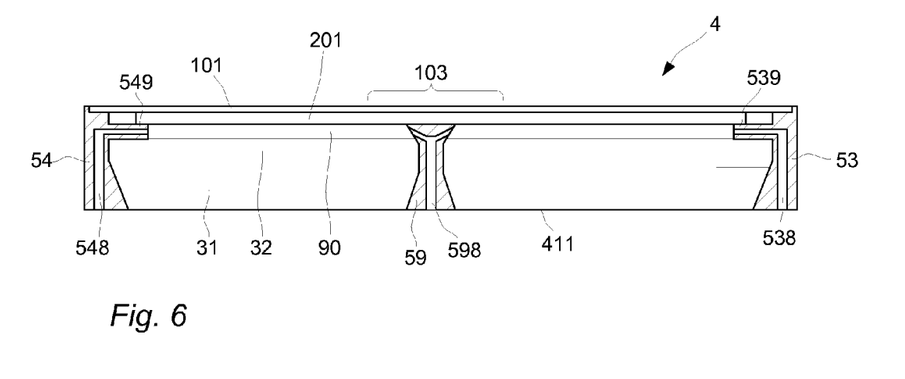
FIG. 6 is a cross-sectional view of another embodiment of a touch-sensitive apparatus.

With further reference to FIG. 6, a schematic cross-section of another embodiment of the apparatus 4 is illustrated. In this embodiment, both the panel 101 and the display 201 are supported by the elongated members 51, 52, 53, 54, for example by a protrusion 539 of the third elongated member 53 and by a protrusion 549 of the fourth elongated member 54. The first elongated member 51 and the second elongated member 52 may have similar protrusions. To fix the panel 101 to the supports, a suitable adhesive may be used. Various kinds of screw arrangements may be used to secure the display 201.

The display 201 may also be supported by a centre support 59 that is located, in the direction of depth D, behind a central portion 103 of the display 201. The centre support 59 is in contact with the display 201 and may extend through the first and second compartments 31, 32 and to the rear plate 411. The light detectors 320a and the scanner modules 310a described in connection with FIG. 5 may be arranged on different sides of the centre support 59. The compartments 31, 32 should be optically sealed at locations where they intersect with the centre support 59, such that light is prevented from passing directly from the first compartment 31 to the light detection arrangement 320 in the second compartment 32.

The centre support 59 may include a channel 598 for conveying air to the display 201 for the purpose of cooling the display 201. A fan may for this purpose be installed at an inlet of the channel 598 together with a filter that prevents dust from entering the channel 598 from a surrounding environment. Instead of using a fan, the air may self-circulate through the channel 598.

The air is typically conveyed to the back of the display 201 and may exit the apparatus 4 through small openings or vents (not shown) in the apparatus 4. For purpose of conveying the air, a vent compartment 90 may be arranged between the display compartment 20 and the second compartment 32. Both the first compartment 31 and the second compartment 32 are optically separated from the vent compartment 90, such that light from the channel 598 or any other vent opening is prevented from being coupled into the panel 101 or directly reach the second compartment 32.

One or more of the elongated members 51, 52, 53, 54 may comprise a channel that functionally corresponds to the channel 598 of the centre support 59, such as channels 538 and 548 in the third elongated member 53 and fourth elongated member 54, respectively. Such channels may be implemented with or without the use of the centre support 59, or the channel 598 in the centre support 59.

Any of the channels of the centre support 59 and elongated members 51, 52, 53, 54 may be used for installing electrical cables from the power supply unit 60 to components of the apparatus 4 that require electrical current for their operation.

In the context of this description, as seen from a perspective of a user of the apparatus, an arrangement of a component/compartment behind another component/compartment may be seen as an arrangement "after" or "underneath" that component/compartment.

From the description above follows that, although various embodiments of the invention have been described and shown, the invention is not restricted thereto, but may also be embodied in other ways within the scope of the subject-matter defined in the following claims.

For example, as an alternative to generating sheets of light by sweeping beams in the geometric plane of the first compartment 31, the individual sheets may be generated by non-swept beams that diverge in the geometric plane away from light sources in the first compartment 31 so as to impinge on a Fresnel lens that redirects the light rays of the diverging beam into a given main direction (i.e. a collimated sheet). Such an apparatus is disclosed in WO2010/134865, which is incorporated herein by this reference.

The invention claimed is:
1. A touch-sensitive apparatus for determining a location of at least one object on a touch surface, the touch-sensitive apparatus extending in a direction of depth and comprising:
   a light transmissive panel that defines the touch surface;

a display arranged, in the direction of depth, behind the light transmissive panel and configured to present an image that is visible through the light transmission panel;

a first compartment arranged, in the direction of depth, behind the display and including a light emitter arrangement configured to emit light to be introduced into the light transmissive panel for propagation by internal reflection in the light transmissive panel; and a second compartment arranged, in the direction of depth, behind the display and including a light detection arrangement configured to receive light that has propagated in the light transmissive panel; and a light blocking sheet that is arranged between the first compartment and the second compartment, wherein the light blocking sheet is parallel with the touch surface, and the second compartment is separated from the first compartment, such that light emitted from the light emitter arrangement is prevented from reaching the light detection arrangement without first having propagated in the light transmissive panel.

2. The touch-sensitive apparatus according to claim 1, wherein the first compartment and the second compartment are arranged, in the direction of depth, at different distances from the display.

3. The touch-sensitive apparatus according to claim 1, wherein the first compartment has a first planar extension and the second compartment has a second planar extension.

4. The touch-sensitive apparatus according to claim 3, wherein the first planar extension and the second planar extension are parallel with the touch surface.

5. The touch-sensitive apparatus according to claim 1, wherein the first compartment is structurally separated from the second compartment.

6. The touch-sensitive apparatus according to claim 1, wherein the light blocking sheet has a planar extension in between the first compartment and the second compartment.

7. The touch-sensitive apparatus according to claim 1, further comprising:

a power supply unit arranged, in the direction of depth, behind the first and second compartments, configured to supply any of the display, the light emitter arrangement and the light detection arrangement with an electrical current.

8. The touch-sensitive apparatus according to claim 1, wherein the light emitter arrangement comprises:

at least two sheet generating modules that are configured to generate the light as sheets of light.

9. The touch-sensitive apparatus according to claim 8, wherein the at least two sheet generating modules are configured to generate the sheets of light in a direction towards two sheet redirecting arrangements, the two sheet redirecting arrangements being configured to re-direct the sheets of light from the at least two sheet generating modules such that the sheets of light are introduced into the light transmissive panel.

10. The touch-sensitive apparatus according to claim 9, further comprising:

a peripheral frame structure on which the two sheet redirecting arrangements are mounted.

11. The touch-sensitive apparatus according to claim 10, wherein the light transmissive panel is mounted on the peripheral frame structure.

12. The touch-sensitive apparatus according to claim 9, wherein each of the two sheet redirecting arrangements comprises:

at least one elongated Fresnel lens, an elongated first mirror and an elongated second mirror that are mounted on the peripheral frame structure.

13. The touch-sensitive apparatus according to claim 1, further comprising:

a centre support that is arranged, in the direction of depth, behind a central portion of the light transmissive panel.

14. The touch-sensitive apparatus according to claim 1, further comprising:

a channel configured to convey air to the display.

15. The touch-sensitive apparatus according to claim 13, wherein the centre support comprises:

a channel configured to convey air to the display.

16. A touch-sensitive apparatus for determining a location of at least one object on a touch surface, the touch-sensitive apparatus extending in a direction of depth and comprising:

a light transmissive panel that defines the touch surface;

a display arranged, in the direction of depth, behind the light transmissive panel and configured to present an image that is visible through the light transmission panel;

a first compartment arranged, in the direction of depth, behind the display and including a light emitter arrangement configured to emit light to be introduced into the light transmissive panel for propagation by internal reflection in the light transmissive panel;

a second compartment arranged, in the direction of depth, behind the display and including a light detection arrangement configured to receive light that has propagated in the light transmissive panel; and a sheet between the first compartment and the second compartment, wherein the second compartment is separated from the first compartment by the sheet, such that light emitted from the light emitter arrangement is prevented from reaching the light detection arrangement without first having propagated in the light transmissive panel, the first compartment and the second compartment are arranged, in the direction of depth, at different distances behind the display, and the sheet is arranged in parallel with the touch surface.

17. The touch-sensitive apparatus of claim 1, further comprising:

a first redirecting arrangement at a first side of the light transmissive panel, the first redirecting arrangement configured to redirect the emitted light; and a second redirecting arrangement at a second side of the light transmissive panel, the second redirecting arrangement configured to redirect the emitted light from the light transmissive panel into the second compartment, wherein the first compartment and the second compartment are arranged, in the direction of depth, at different distances behind the display, and the first side of the light transmissive panel is opposite the second side of the light transmissive panel.

18. The touch-sensitive apparatus of claim 1, wherein:

the first compartment and the second compartment are arranged, in the direction of depth, at different distances behind the display; and the light emitter arrangement and the light detection arrangement are arranged at a center portion of the light transmissive panel.

19. A touch-sensitive apparatus for determining a location of at least one object on a touch surface, the touch-sensitive apparatus extending in a direction of depth and comprising:

a light transmissive panel that defines the touch surface;

a display arranged, in the direction of depth, behind the light transmissive panel and configured to present an image that is visible through the light transmission panel;

a first compartment arranged, in the direction of depth, behind the display and comprising a light emitter arrangement configured to emit light to be introduced into the light transmissive panel for propagation by internal reflection in the light transmissive panel;

a second compartment arranged, in the direction of depth, behind the display and comprising a light detection arrangement configured to receive light that has propagated in the light transmissive panel; and a light blocking sheet arranged between the first compartment and the second compartment to separate the first compartment from the second compartment, the light blocking sheet being arranged in parallel with the touch surface, and being configured to prevent light from the light emitter from reaching the light detection arrangement without first having propagated in the light transmissive panel at least the length of the light blocking sheet.

* * * * *